3,206,377
EXTRACTIVE SEPARATION PROCESS
David Cornell, Stillwater, Okla., and Gail H. Birum and James R. Fair, Dayton, Ohio, assignors to Monsanto Company, a corporation of Delaware
No Drawing. Filed July 10, 1961, Ser. No. 122,668
19 Claims. (Cl. 202—39.5)

The present invention relates generally to the separation, concentration, and/or purification of hydrocarbons having various degrees of saturation. It is an object of the invention to separate close-boiling hydrocarbons of the classes of paraffins, monoolefins, diolefins, naphthenes, aromatic hydrocarbons and isomers thereof by the use of phosphorous compounds having the following structural formula:

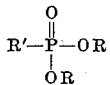

wherein R' is selected from the class consisting of hydrogen, hydrocarbon, halohydrocarbon and cyanohydrocarbon radicals and R is selected from the class consisting of hydrocarbon and halohydrocarbon radicals as the extraction agents. It is also an object of the invention to carry out the said separations by means of an extractive distillation method employing the said phosphorous compounds as the extracting agent.

In a number of hydrocarbon processing operations including cracking, reforming, aromatizing, and dehydrogenating, a wide spectrum of hydrocarbons is formed having various degrees of unsaturation or of solubility parameter, cohesive energy density, or internal pressure. It is therefore desirable to be able to make a type separation in order to remove substantially all of each individual family group of hydrocarbons, i.e., the paraffins, monoolefins, diolefins, naphthenes and aromatic hydrocarbons. Further separations such as one olefin from another is also a desired objective. Conventional distillation methods are often poorly adapted to the separation and recovery of such classes of hydrocarbons in view of the small differences in the boiling points of the respective compounds. It has also been found that azeotropic distillation in which the azeotrope agents are added to reduce the boiling point of certain components is impractical because of the separation difficulties between such agents and the compounds with which the azeotrope has been formed.

It has now been found that the use of the above-described phosphorous compounds makes it possible to conduct extractive separations among the above-described classes of hydrocarbons. In carrying out the present invention utilizing the said phosphorous compounds in an extractive distillation process the phosphorous compound or a mixture thereof is introduced into a distillation column at a point near the top of the column. In this case the one hydrocarbon fraction is withdrawn as the overhead product, while the other hydrocarbon group is obtained as a bottoms product dissolved in the phosphorus compound as the extractive distillation solvent.

The present method is applicable to the separation of hydrocarbons of the classes of paraffins, monoolefins, diolefins, naphthenes and aromatic hydrocarbons, as well as many individual members within such a class, for example, butene-2 from butene-1. The present method is also applicable to the separation of hydrocarbon isomers such as i-pentane from n-pentane, 2-methylbutene-1 from 2-methylbutene-2 and o-xylene from p-xylene. The extractive distillation process using the said phosphorous compounds yields a vapor fraction containing the more volatile of the said hydrocarbons. The volatility here referred to is that of the hydrocarbon when in solution in the phosphorus compound, such volatility being the product $\gamma P_V$, where $\gamma$ is the activity coefficient and $P_V$ is the vapor pressure of the hydrocarbon.

Relative volatility, $\alpha$, is therefore, the ratio of the $\gamma P_V$ products for two hydrocarbons.

It has been found that the present method is efficacious as an extractive process with a wide variety of crude hydrocarbon mixtures. Examples of such starting mixtures include the paraffin, monoolefin, and diolefin mixture obtained in the dehydrogenation of butane and butene in order to produce butadiene as the desired product. Another type of crude hydrocarbon mixture which is readily separated by the method of this invention is the octane-octene mixture resulting from the dehydrogenation of a $C_8$ fraction. Another type of hydrocarbon fraction which can be separated by the present process is a mixture of 5 carbon atom hydrocarbons obtained in a dehydrogenation of pentenes including isopentane in order to produce isoprene. The impurities in such a crude mixture include normal pentane, pentene-1, 2-methylbutene-1, and 2-methylbutene-2. Another crude hydrocarbon mixture readily separated by means of the present method is the mixture of naphthenes and aromatic hydrocarbons obtained in the aromatizing of normal hexane and the subsequent dehydrogenation of such crude mixture to produce benzene.

The proportion of the phosphorus compound employed in the present extractive separation methods varies over the range of from 0.5 to 10 moles of the said phosphorus compound per mole of the crude hydrocarbon mixture, a preferred range being from 1 to 5 moles. The separation processes may be operated over a wide range of temperatures such as from 100° F. to 300° F., the upper temperature being limited by the tendency of the hydrocarbon to polymerize rather than by any inherent limitation of the extractive distillation process. The use of vacuum or pressure conditions in addition to atmospheric pressure is also a part of the present invention such expedients being utilized in accordance with conventional practice in order to aid in the separation of low boiling components or in order to maintain high boiling components in the liquid without undue volatilization.

The apparatus employed in the extractive distillation process is typical of the equipment available in this field. It is obvious that such a distillation process may be conducted with any conventional distillation column of the bubble-plate, packed, or sieve-plate type as may be desired. The selection of the best reflux ratio, size and number of plates and other details of column design necessary in order to obtain the desired degree of purity will be obvious to one skilled in the art having the benefit of the present disclosure. If necessary to prevent or minimize the polymerization of unsaturated compounds, conventional polymerization inhibitors may also be used.

The apparatus employed constitutes a conventional extractive distillation column in which the crude mixture of hydrocarbons is charged to the middle region of a column with reflux being returned near the top of the column, while the overhead vapor fraction is withdrawn as an enriched stream of the material with the higher degree of saturation (or lower solubility parameter). The phosphorus compound solvent from any source is introduced into the column at a plate located several plates below the top of the column. The bottoms stream leaving the column contains the material with the lower degree of saturation or higher solubility parameter, together with the solvent. Where more than one class of hydrocarbons is present in the vapor and/or liquid fractions, these fractions may be separately further treated with the extractive distillation solvent to effect further hydrocarbon separations or, where the boiling points or miscibilities of the various hydrocarbons are sufficiently different, other techniques such as fractional distillation or solvent extraction separation are suitable. In subsequent extractive distillations the more volatile hydrocarbon(s) is withdrawn as overhead vapors and the less volatile hydrocarbon(s) is withdrawn as liquid bottoms. The mixture of solute and solvent in the bottoms fraction is then separated into its components by conventional stripping or separation means, which may comprise the use of water washing, solvent extraction, distillation, or freezing, by which means one may obtain the bottoms solute in the desired pure state. For example, one may employ a conventional fractionation or stripper column, wherein by simple fractional distillation the solute from the bottoms product is recovered as the overhead fraction of the stripper in pure form. In another type of column the bottoms solute in admixture with the solvent is fed into the middle region of a column, while steam or another heated inert gas is fed to the bottom of the column. The overhead product from such stripping operation is the pure solute, while the solvent is obtained as the bottoms product which is then dried and recycled to the main distillation column, as described above.

It has been found that the disclosed phosphorus compounds are particularly advantageous in the present process, since these materials are relatively stable against decomposition and are non-reactive with respect to the hydrocarbons as well as any impurities which are conventionally found in such crude mixtures. It is also an advantage that the phosphorus compounds are generally relatively non-toxic and are relatively inexpensive materials. The use of phosphorus compounds as herein disclosed makes it possible to separate close-boiling hydrocarbons in a considerably smaller column than would be required for conventional distillation.

The comparative selectivity of an extractive distillation solvent is best determined by its specific efficiency with respect to the hydrocarbon pair which are to be separated in the present method. This efficiency may be expressed as the relative volatility of the two hydrocarbons in the presence of the phosphorus compound solvent. The equation which expresses this relative volatility (alpha) is:

$$\alpha = \frac{(\gamma P_V) \text{ hydrocarbon 1}}{(\gamma P_V) \text{ hydrocarbon 2}}$$

where (gamma) represents the activity coefficients defined by the following equation:

$$\gamma_1 = \frac{Y_1 P_T}{X_1 P_{V1}}$$

In the above equation $X_1$ and $Y_1$ represent the mole fractions of a given component in the liquid and vapor phases, respectively, while $P_V$ and $P_T$ represent the vapor pressure of the given component, and the total pressure of the system respectively.

In addition to selectivity, solubility of hydrocarbons in the phosphorus compounds must be considered. The quantity of hydrocarbon dissolved in the solvent is governed by the temperature and pressure of the separation and by the character of the solvent and the hydrocarbon system.

The term, solubility parameter, is used in preference to the terms internal pressure or cohesive energy density. These terms are essentially equivalent. Cohesive energy density is the square of the solubility parameter, while internal pressure is 41.311 × cohesive energy density.

The definition of the solubility parameter referred to in the previous paragraphs is as follows:

$$\delta = (\Delta E / V)^{1/2}$$

$\Delta E$ = internal energy of vaporization, calories/(g. mole)
$V$ = molal liquid volume, cc./(g. mole)

For the condition of ideal gases, $\Delta E$ may be calculated from handbook values of the latent heat of vaporization, $\Delta H_v$. The temperatures are expressed as degrees, Kelvin.

$$\Delta E = \Delta H_v - RT$$

$\Delta H_v$ = latent heat of vaporization, calories (g. mole)
$R$ = 1.987 calories/(g. mole) (° K.)
$T$ = absolute temperature, ° K.

It has been found by means of solubility measurements, standardized at 770 F., that naphthenes or aromatic hydrocarbons with a solubility parameter greater than about 8.4 are quite soluble in these phosphorus compounds. Conversely, paraffin or naphthene hydrocarbons with lesser solubility parameters are much less miscible. It has also been found that the solubility parameters given above are affected by the temperature of the system. Monoolefins and diolefins exhibit much greater miscibility with the phosphorus compound solvents than corresponding paraffin hydrocarbons. Accordingly, a separation can be effected through either a difference in degree of saturation or, in the case of paraffin, naphthene, and aromatic compounds, through a difference in solubility parameter.

A number of hydrocarbon mixtures are employed to demonstrate the selectivity of the above-described phosphorus compounds as extractive distillation solvents. The relative volatility of the components is determined under the conditions of temperature, pressure and concentration as set forth in the examples below.

The following examples illustrate specific embodiments of the invention—the symbols used are defined supra:

EXAMPLE 1

This example illustrates the separation of hydrocarbon classes from a mixture of two or more hydrocarbon classes using the phosphorous compounds of this invention as extractive distillation solvents in the manner described above. Table I sets forth the experimental vapor-liquid equilibrium data. In Runs Nos. 1 and 5 comprising a mixture of paraffins, monoolefins and diolefins, the liquid phase consists essentially of the diolefin and minor amounts of monoolefins and paraffins, and the vapor phase consists essentially of the paraffin with minor amounts of monoolefin and diolefin. Successive treatment of the vapor and liquid phases under like conditions in the first distribution phase results in further separation and purification of the individual classes of hydrocarbons.

In Run No. 2, comprising a mixture of paraffins and naphthenes, the naphthene is cleanly separated in the liquid phase from the paraffin in the vapor phase.

In Run No. 3 a mixture of paraffins, naphthenes and aromatic hydrocarbons is separated in the same manner described above.

In Run No. 4, branch-chain paraffins, cycloparaffins and aromatic hydrocarbons are separated.

In the same manner, other hydrocarbon mixtures resulting from normal hydrocarbon processing operations such as cracking, reforming, aromatizing and dehydrogenating, are likewise separable using the phosphorous compounds herein described as extractive distillation solvents.

*Table I*

| Run | Solvent | Solute | X mole Fr. | Y mole Fr. | P, mm. Hg total | t, °F. | Pv, mm. Hg vapor | $\gamma$ | Relative volatility, $\alpha$ |
|---|---|---|---|---|---|---|---|---|---|
| 1 | Dimethyl phosphonate | n-Pentane | 0.0223 | 0.2233 | 733.5 | 102 | 838 | 8.76 | 3.23 |
|  |  | 2-methylbutene-1 | 0.0426 | 0.2407 |  |  | 982 | 4.22 | 1.83 |
|  |  | 2-methylbutene-2 | 0.0533 | 0.2556 |  |  | 765 | 4.78 | 1.61 |
|  |  | 2-methylbutadiene 1,3 (isoprene) | 0.0869 | 0.2704 |  |  | 894 | 2.55 | 1.00 |
| 2 | do | n-Hexane | 0.0194 | 0.4401 | 735.2 | 159 | 802 | 20.8 | 1.63 |
|  |  | Methyl cyclopentane | 0.0405 | 0.5599 |  |  | 713 | 14.3 | 1.00 |
| 3 | do | n-Hexane | 0.0188 | 0.1733 | 734.1 | 190 | 1,334 | 5.07 | 7.85 |
|  |  | Methyl cyclopentane | 0.0328 | 0.2015 |  |  | 1,200 | 3.76 | 5.25 |
|  |  | Benzene | 0.5319 | 0.6252 |  |  | 946 | 0.91 | 1.00 |
| 4 | do | 2,4-dimethyl pentane | 0.0322 | 0.2086 | 738.9 | 190 | 950 | 7.45 | 5.20 |
|  |  | Cyclohexane | 0.0583 | 0.3974 |  |  | 945 | 5.33 | 3.72 |
|  |  | Benzene | 0.1593 | 0.2940 |  |  | 946 | 1.44 | 1.00 |
| 5 | Diethyl phosphonate | Butane | 0.01 | .3804 | 732.9 | 100 | 2,655 | 10.5 | 1.75 |
|  |  | Butene | 0.01 | .4020 |  |  | 3,221 | 9.15 | 1.84 |
|  |  | Butadiene-1,3 | 0.01 | .2175 |  |  | 3,060 | 5.21 | 1.00 |

EXAMPLE 2

This example illustrates the separation of paraffin-olefin hydrocarbon mixtures using various phosphorous compounds as the extractive distillation solvent. Table II sets forth the experimental vapor-liquid equilibrium data. The olefins having a lower relative volatility value, remain in the liquid phase as bottoms, while the paraffins having the higher relative volatility pass into the vapor phase and are so separated from the olefins.

EXAMPLE 3

This example illustrates the separation of individual paraffinic isomers from mixtures thereof using the phosphorous compounds of this invention as extractive distillation solvents. Table III sets forth the experimental vapor-liquid equilibrium data. The data also show the separation of paraffinic hydrocarbons from cycloparaffinic hydrocarbons.

EXAMPLE 4

This example illustrates the separation of monoolefins from mixtures thereof and/or from diolefins using the phosphorus compounds of this invention as the extractive distillation solvents. Table IV sets forth the experimental vapor-liquid equilibrium data. The values of the relative volatilities reported in the table demonstrates that olefinic isomers are separable using these extractive distillation solvents.

EXAMPLE 5

This example illustrates the separation of aromatic hydrocarbons from mixtures containing same together with paraffins and/or naphthenes. Also, the separation of aromatic hydrocarbons from other aromatic hydrocarbons is illustrated. This example further demonstrates the utility of the extractive distillation solvents herein described for the separation of isomers of aromatic compounds. Table V sets forth the experimental vapor-liquid equilibrium data.

EXAMPLE 6

This example illustrates the separation of hydrocarbon mixtures using a variety of other phosphorous compounds having different functional groups which are operable as extractive distillation solvents as herein disclosed. Table VI sets forth the vapor-liquid equilibrium data.

*Table II*

| Run | Solvent | Solute | X mole Fr. | Y mole Fr. | P, mm. Hg total | t, °F. | Pv, mm. Hg vapor | $\gamma$ | Relative volatility, $\alpha$ |
|---|---|---|---|---|---|---|---|---|---|
| 1 | Diethyl methyl phosphonate | i-Pentane | 0.0847 | 0.2506 | 743.9 | 100 | 1,050 | 2.10 | 1.44 |
|  |  | n-Pentane | 0.1165 | 0.2782 |  |  | 796 | 2.23 | 1.78 |
|  |  | 2-methylbutene-1 | 0.1222 | 0.2498 |  |  | 946 | 1.61 | 1.23 |
|  |  | 2-methylbutene-2 | 0.1330 | 0.2214 |  |  | 734 | 1.69 | 1.00 |
| 2 | Diethyl phosphonate | n-Pentane | 0.0214 | 0.2309 | 740.7 | 174 | 2,700 | 2.96 | 1.36 |
|  |  | Pentene-1 | 0.0272 | 0.2628 |  |  | 3,155 | 2.27 | 1.23 |
|  |  | 2-methylbutene-1 | 0.2069 | 0.2465 |  |  | 3,100 | 2.20 | 1.16 |
|  |  | 2-methylbutene-2 | 0.0326 | 0.2587 |  |  | 2,520 | 2.33 | 1.00 |
| 3 | Diethyl cyanomethyl phosphonate | n-Pentane | 0.0186 | 0.4869 | 742.5 | 150 | 1,898 | 10.2 | 1.72 |
|  |  | Pentene-1 | 0.0338 | 0.5131 |  |  | 2,245 | 5.02 | 1.00 |
| 4 | Dibutyl chloromethyl phosphonate | n-Pentane | 0.1643 | 0.5029 | 742.9 | 150 | 1,898 | 1.20 | 1.19 |
|  |  | Pentene-1 | 0.1934 | 0.4971 |  |  | 2,245 | 0.85 | 1.00 |
| 5 | Bis(B-chloroethyl)vinylphosphonate | n-Pentane | 0.0224 | 0.5009 | 728.6 | 164 | 2,340 | 6.96 | 1.90 |
|  |  | Pentene-1 | 0.0425 | 0.4991 |  |  | 2,740 | 3.12 | 1.00 |
| 6 | Dimethyl chloromethylphosphonate | n-Pentane | 0.0164 | 0.5059 | 742.7 | 150 | 1,898 | 12.1 | 1.71 |
|  |  | Pentene-1 | 0.0274 | 0.4941 |  |  | 2,245 | 5.96 | 1.00 |

*Table III*

| Run | Solvent | Solute | X mole Fr. | Y mole Fr. | P, mm. Hg total | t, °F. | Pv, mm. Hg vapor | $\gamma$ | Relative volatility, $\alpha$ |
|---|---|---|---|---|---|---|---|---|---|
| 1 | Diethyl methylphosphonate | i-Pentane | 0.0288 | 0.1882 | 738.3 | 128 | 1,680 | 2.87 | 1.33 |
|  |  | n-Pentane | 0.0458 | 0.2240 |  |  | 1,324 | 2.73 | 1.00 |
| 2 | Diisopropyl methylphosphonate | i-Pentane | 0.0506 | 0.2327 | 739.9 | 134 | 1,846 | 1.90 | 1.20 |
|  |  | n-Pentane | 0.0721 | 0.2833 |  |  | 1,463 | 1.99 | 1.00 |
| 3 | Dimethyl phosphonate | n-Hexane | 0.0188 | 0.1733 | 734.1 | 190 | 1,334 | 3.76 | 5.23 |
|  |  | Methyl cyclohexane | 0.0328 | 0.6252 |  |  | 946 | 0.91 | 1.00 |
| 4 | do | 2,4-dimethylpentane | 0.0322 | 0.3086 | 738.9 | 190 | 950 | 7.45 | 1.40 |
|  |  | Cyclohexane | 0.0583 | 0.3974 |  |  | 945 | 5.33 | 1.00 |

Table IV

| Run | Solvent | Solute | X mole Fr. | Y mole Fr. | P, mm. Hg total | t, °F. | Pv, mm. Hg vapor | γ | Relative volatility, α |
|---|---|---|---|---|---|---|---|---|---|
| 1 | Diethyl methylphosphonate | 2-methylbutene-1<br>2-methylbutene-2<br>Isoprene | 0.0487<br>0.0559<br>0.0710 | 0.2042<br>0.1932<br>0.1903 | 738.3 | 128 | 1,550<br>1,225<br>1,406 | 2.00<br>2.08<br>1.41 | 1.56<br>1.29<br>1.00 |
| 2 | Diethyl phosphonate | Pentene-1<br>2-methylbutene-1<br>2-methylbutene-2 | 0.0272<br>0.0269<br>0.0326 | 0.2628<br>0.2476<br>0.2587 | 740.7 | 174 | 3,155<br>3,100<br>2,520 | 2.27<br>2.20<br>2.33 | 1.23<br>1.16<br>1.00 |
| 3 | Dimethyl phosphonate | 2-methylbutene-1<br>Isoprene | 0.0426<br>0.0869 | 0.2704<br>0.2407 | 733.5 | 102 | 894<br>982 | 2.55<br>4.22 | 1.82<br>1.00 |
| 4 | Diethyl methylphosphonate | 2-methylbutene-1<br>2-methylbutene-2 | 0.1222<br>0.1330 | 0.2498<br>0.2214 | 743.9 | 100 | 946<br>734 | 1.61<br>1.59 | 1.23<br>1.00 |
| 5 | Diethyl phosphonate | Pentene-1<br>2-methylbutene-1 | 0.0272<br>0.0269 | 0.2628<br>0.2476 | 740.7 | 174 | 3,155<br>3,100 | 2.27<br>2.20 | 1.05<br>1.00 |

Table V

| Run | Solvent | Solute | X mole Fr. | Y mole Fr. | P, mm. Hg total | t, °F. | Pv, mm. Hg vapor | γ | Relative volatility, α |
|---|---|---|---|---|---|---|---|---|---|
| 1 | Dimethyl phosphonate | Cyclohexane<br>Benzene | 0.0583<br>0.1593 | 0.3974<br>0.2940 | 738.9 | 190 | 945<br>946 | 5.33<br>1.44 | 3.72<br>1.00 |
| 2 | do | Ethylbenzene<br>Styrene | 0.2310<br>0.3908 | 0.6065<br>0.3935 | 55.0 | 150 | 72<br>55 | 1.82<br>0.92 | 2.66<br>1.00 |
| 3 | do | n-Hexane<br>Benzene | 0.0188<br>0.5319 | 0.1733<br>0.6252 | 734.1 | 190 | 1,334<br>946 | 5.07<br>0.91 | 5.22<br>1.00 |
| 4 | do | 2,4-dimethylpentane<br>Benzene | 0.0322<br>0.1593 | 0.3086<br>0.2940 | 738.9 | 190 | 950<br>946 | 7.45<br>1.44 | 5.20<br>1.00 |
| 5 | do | Methyl cyclopentane<br>Benzene | 0.0328<br>0.5319 | 0.0215<br>0.6252 | 734.1 | 190 | 1,200<br>946 | 3.76<br>0.91 | 5.22<br>1.00 |
| 6 | do | p-Xylene<br>o-Xylene | 0.4529<br>0.4000 | 0.5471<br>0.4062 | 103.0 | 179 | 125.0<br>101.6 | 1.08<br>1.03 | 1.29<br>1.00 |

Table VI

| Run | Solvent | Solute | X mole Fr. | Y mole Fr. | P, mm. Hg total | t, °F. | Pv, mm. Hg vapor | γ | Relative volatility, α |
|---|---|---|---|---|---|---|---|---|---|
| 1 | Bis(2-ethylhexyl) phenylphosphonate. | n-Pentane<br>Pentene-1 | 0.1346<br>0.1393 | 0.4989<br>0.5011 | 744.3 | 172 | 2,620<br>3,080 | 1.05<br>0.87 | 1.03<br>1.00 |
| 2 | Diethyl cyanomethylphosphonate. | n-Pentane<br>Pentene-1 | 0.0186<br>0.0338 | 0.4869<br>0.4131 | 742.5 | 150 | 1,898<br>2,245 | 10.2<br>5.02 | 1.72<br>1.00 |
| 3 | Bis(r-chloroethyl) phonate. | n-Pentane<br>Pentene-1 | 0.0224<br>0.0425 | 0.5009<br>0.4991 | 728.6 | 164 | 2,340<br>2,740 | 6.96<br>3.12 | 1.90<br>1.00 |

A demonstration of the effectiveness of the phosphorus compound solvents used herein in the separation of hydrocarbons may be made by reference to experimental data on hydrocarbon selectivity for a known extractive distillation solvent, e.g., ethylene carbonate. For the purpose of this comparison a mixture of ethylbenzene and styrene was separately treated under identical conditions with ethylene carbonate and dimethyl phosphonate. The data are shown in the following table:

Table VII

| Solvent | Solvent ratio, vol. solv./vol. hydrocarbon | t, °F. | Relative volatility, α, ethylbenzene/styrene |
|---|---|---|---|
| Ethylene carbonate | 0.48 | 152 | 1.72 |
| Dimethyl phosphonate | 0.48 | 152 | 2.60 |

To compare the relative effectiveness of the solvents the following formula is used:

$$\frac{\alpha - \alpha_n}{\alpha_{ec} - \alpha_n}$$

where $\alpha_n$ equals the natural relative volatility of ethylbenzene (in the absence of any solvent); this value is 1.31, with respect to styrene having a value 1.00, and ec is ethylene carbonate. Substituting in the formula the above α values for ethylene carbonate and dimethyl phosphonate gives.

$$\frac{2.60 - 1.31}{1.72 - 1.31} = 3.07$$

which shows dimethyl phosphonate is, on a percent basis, 307% as effective as ethylene carbonate as an extractive distillation solvent.

Other typical phosphorus compounds within the class defined by generic formula recited supra, which are likewise operable as extractive distillation solvents within the purview of the instant invention are as follows: dipropyl phosphonate, dioctyl phosphonate, dibutyl dodecylphosphonate, didodecyl ethylphosphonate, dibutyl propylphosphonate, dibutyl octylphosphonate, phenyl butyl butylphosphonate, phenyl propyl phenylphosphonate, ditolyl phenylphosphonate, dinaphthyl phosphonate, ethyl propyl chloromethylphosphonate, dipropyl β-chloroethyl phosphonate, bis(β - bromoethyl)phosphonate, diethyl chlorophenylphosphonate, dimethyl cyanoethylphosphonate, dioctyl cyanomethylphosphonate, butyl propyl 4-cyanobutylphosphonate, diphenyl cyanoethylphosphonate, dinaphthyl cyanopropylphosphonate, bis(β - chloroethyl) vinylphosphonate, bromoethyl propyl propylphosphonate, divinyl propylphosphonate, dichlorophenyl phosphonate, diethyl cyanophenylphosphonate, bis(β-chloroethyl) β-chloroethylphosphonate, cyclohexyl methyl methylphosphonate, dicyclohexyl hexylphosphonate, dicyclopentyl vinylphosphonate, dicyclopentyl phenylphosphonate, dipropyl cyclohexylphosphonate, diphenyl cyclopentylphosphonate, diethyl chlorocyclohexylphosphonate, bis(chlorocyclohexyl)ethylphosphonate.

The phosphonates employed in this invention contain up to twelve carbon atoms in the individual hydrocarbon or substituted hydrocarbon groups in the ester portion of the phosphonate and also in the hydrocarbon or substituted-hydrocarbon group attached to the phosphino

residue. A more desirable range of carbon atoms in the hydrocarbon or substituted-hydrocarbon radical is from one to eight carbon atoms. More preferably, the hydrocarbon and/or substituted hydrocarbon radicals contain from one to five carbon atoms.

The phosphorus compounds used herein are prepared by conventional means known to the art. For example, Kosolapoff's "Organophosphorus Compounds," Wiley and Sons, Inc. (1950) chapters 7 and 8, page 121 et seq., lists several methods of preparation for the class of compounds recited herein.

The above data demonstrate that the hereinbeforedescribed phosphorus compounds are highly effective as extractive distillation solvents in the separation of hydrocarbon mixtures.

What is claimed is:

1. The method of separating components from a mixture containing a plurality of compounds selected from the group consisting of paraffins, monoolefins, diolefins, naphthenes and aromatic hydrocarbons, which comprises contacting the said mixture with a phosphorus compound having the following structural formula:

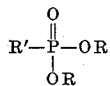

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the more volatile of the said components, and also withdrawing a liquid fraction containing the less volatile components dissolved in the said phosphorus compound and thereafter separating the individual components from each of said fractions and stripping the said phosphorus compounds from the hydrocarbons dissolved therewith.

2. The method of separating paraffins from olefins from a mixture comprising hydrocarbons of the classes consisting of paraffins and olefins, which comprises contacting the said mixture with a phosphorus compound having the following structural formula:

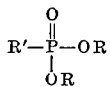

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the paraffins and also withdrawing a liquid fraction containing the olefins dissolved in the said phosphorus compound.

3. The method according to claim 2 wherein the paraffin is pentane and the olefin is pentene.

4. The method according to claim 2 wherein the paraffin is pentane and the olefin is methylbutene.

5. The method of separating diolefins from a mixture comprising hydrocarbons of the classes consisting of paraffins, monoolefins, diolefins, naphthenes and aromatic hydrocarbons which comprises contacting the said mixture with a phosphorus compound having the following structural formula:

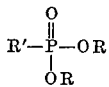

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the paraffins, naphthenes, monoolefins and diolefins and also withdrawing a liquid fraction containing the aromatic hydrocarbons dissolved in the said phosphorus compound and thereafter contacting the hydrocarbon mixture comprising the vapor fraction with additional amounts of said phosphorus compound in a second extractive distillation to remove the paraffins, naphthenes and monoolefins as a vapor fraction from the diolefins dissolved in said phosphorus compound and thereafter stripping the said phosphorus compound from the diolefins dissolved therewith.

6. The method according to claim 5 wherein the diolefin is butadiene.

7. The method of separating paraffins from a mixture comprising hydrocarbons of the classes consisting of paraffins and naphthenes which comprises contacting the said mixture with a phosphorus compound having the following structural formula:

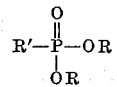

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the paraffins and also withdrawing a liquid fraction containing the naphthenes dissolved in the said phosphorus compound and thereafter stripping the said phosphorus compound from the naphthene dissolved therewith.

8. The method according to claim 7 wherein the naphthene is methylcyclopentane and the paraffin is hexane.

9. The method of separating aromatic hydrocarbons from a mixture comprising hydrocarbons of the classes consisting of paraffins, naphthenes, olefins and aromatic hydrocarbons which comprises contacting the said mixture with a phosphorus compound having the following structural formula:

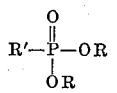

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the paraffins, olefins and naphthenes, and also withdrawing a liquid fraction containing the aromatic hydrocarbons dissolved in the said phosphorus compound and thereafter stripping the said phosphorus compound from the hydrocarbons dissolved therewith.

10. The method according to claim 9 wherein the aromatic hydrocarbon is benzene.

11. The method according to claim 9 wherein the aromatic hydrocarbon is benzene, the naphthene is methylcyclopentane, the paraffin is 2,4-dimethylpentane, and the olefin is a pentene.

12. The method of separating paraffinic hydrocarbon isomers from a mixture thereof which comprises contacting the said mixture with a phosphorus compound having the following structural formula:

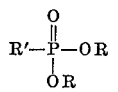

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the more volatile of the said hydrocarbon isomers, and also withdrawing a liquid fraction containing the less volatile hydrocarbon isomers dissolved in the said phosphorus compound and thereafter stripping the said phosphorus compound from the hydrocarbon isomers dissolved therewith.

13. The method according to claim 12 wherein the paraffinic hydrocarbon isomers are i-pentane and n-pentane, the i-pentane separating in the vapor phase.

14. The method of separating olefinic hydrocarbon isomers from a mixture thereof which comprises contacting the said mixture with a phosphorus compound having the following structural formula:

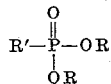

wherein R' is selected from the class consisting of hydrogen, hydrocarbon, halohydrocarbon and cyanohydrocarbon radicals and R is selected from the class consisting of hydrocarbon and halohydrogen radicals in an extractive distillation separation, withdrawing a vapor fraction containing the more volatile of the said hydrocarbon isomers and also withdrawing a liquid fraction containing the less volatile hydrocarbon isomers dissolved in the said phosphorus compound and thereafter stripping the said phosphorus compound from the hydrocarbons dissolved therewith.

15. The method according to claim 14 wherein the olefinic hydrocarbon isomers are pentene-1 and methylbutene, the former isomer separating in the vapor phase.

16. The method of separating one aromatic hydrocarbon from another in a mixture thereof which comprises contacting the said mixture with a phosphorus compound having the following structural formula:

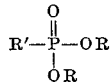

wherein R' is selected from the class consisting of hydrogen, hydrocarbon, halohydrocarbon and cyanohydrocarbon radicals and R is selected from the class consisting of hydrocarbon and halohydrocarbon radicals in an extractive distillation separation, withdrawing a vapor fraction containing the more volatile of the said hydrocarbons, and also withdrawing a liquid fraction containing the less volatile hydrocarbons dissolved in the said phosphorus compound and thereafter stripping the said phosphorus compound from the hydrocarbons dissolved therewith.

17. The method according to claim 16 wherein one of the aromatic hydrocarbons is styrene and the other aromatic hydrocarbon is ethylbenzene, the latter hydrocarbon separating in the vapor phase.

18. Method for the separation of aromatic hydrocarbon isomers from each other in a mixture thereof which comprises subjecting the said hydrocarbon mixture to extractive distillation in the presence of a phosphorus compound having the following structural formula:

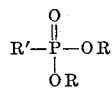

wherein R' is selected from the class consisting of hydrogen, hydrocarbon, halohydrocarbon and cyanohydrocarbon radicals and R is selected from the class consisting of hydrocarbon and halohydrocarbon radicals, withdrawing a vapor fraction comprising the more volatile isomers and a liquid fraction comprising the said phosphorus compound containing dissolved therein the less volatile isomers and stripping the said less volatile isomers from the said phosphorus compound.

19. The method according to claim 18 wherein the aromatic hydrocarbon isomers are o-xylene and p-xylene, the latter isomer separating in the vapor phase.

References Cited by the Examiner

UNITED STATES PATENTS 2,567,228   9/51   Morrell et al. _____ 202—39.5

OTHER REFERENCES

Blake et al.: Article, I & EC, vol. 50, No. 12, December 1958, pp. 1763–1767.

NORMAN YUDKOFF, *Primary Examiner.*

ALPHONSO D. SULLIVAN, *Examiner.*